United States Patent Office 3,790,590
Patented Feb. 5, 1974

3,790,590
2-AMINO - 1,3,4 - THIADIAZOLE-5-CARBOXALDE-HYDE OXIME AND 2-ACETAMIDO-1,3,4-THIADI-AZOLE-CARBONITRILE
William Alan Remers, West Lafayette, Ind., Gabriel Joseph Gibs, Pearl River, N.Y., and Martin Joseph Weiss, Oradell, N.J., assignors to American Cyanamid Company, Stamford, Conn.
No Drawing. Application Oct. 30, 1970, Ser. No. 85,736, now Patent No. 3,700,684, which is a continuation-in-part of application Ser. No. 766,986, Oct. 11, 1968, now Patent No. 3,564,002. Divided and this application Feb. 24, 1972, Ser. No. 229,151
Int. Cl. C07d 91/62
U.S. Cl. 260—306.8 D                                    2 Claims

ABSTRACT OF THE DISCLOSURE

The preparation of 2-amino or substituted amino-5-substituted thiadiazoles are described. They are useful as intermediates for the preparation of, for example, 2-(2-amino-5-1,3,4-thiadiazolyl)-1-methyl - 5 - nitroimidazole which has anti-protozoal and anti-bacterial properties.

This application is a divisional of our application Ser. No. 85,736, filed Oct. 30, 1970 now U.S. Pat. 3,700,684, which is a continuation-in-part of our application Ser. No. 766,986, filed Oct. 11, 1968, now U.S. Pat. 3,564,002.

SUMMARY OF THE INVENTION

The present invention relates to novel 2-amino or substituted amino-5-substituted 1,3,4-thiadiazoles and methods of preparing the same.

The compounds of this invention can be defined as those of the formula:

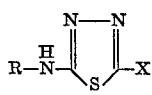

wherein R is selected from the group consisting of hydrogen and lower alkanoyl and X is selected from the group consisting of carbonitrile and carboxaldehyde oxime. The term lower alkanoyl includes those having 1 to 4 carbon atoms in addition to the carbonyl group.

The compounds of the present invention are usually crystalline solids somewhat soluble in water. Those capable of forming acid addition salts in the form of salts are more water soluble.

The compounds of the present invention are useful as intermediates for the preparation of compounds of Formula A, wherein R is lower alkyl, as well as of the N-acetyl derivatives thereof.

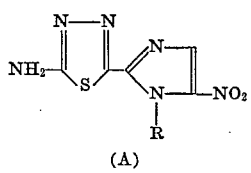

(A)

The compounds of Formula A and the corresponding N-acetyl derivatives show very important oral, broad-spectrum anti-bacterial activity as well as activity against colibacillosis, fowl typhoid, enteritis and trichomonas vaginalis infections.

The preparation of the compounds of the present invention and the conversion to the highly physiologically active 2 - (2-amino-5-1,3,4-thiadiazolyl)-1-methyl-5-nitroimidazole is shown in the following flowsheet.

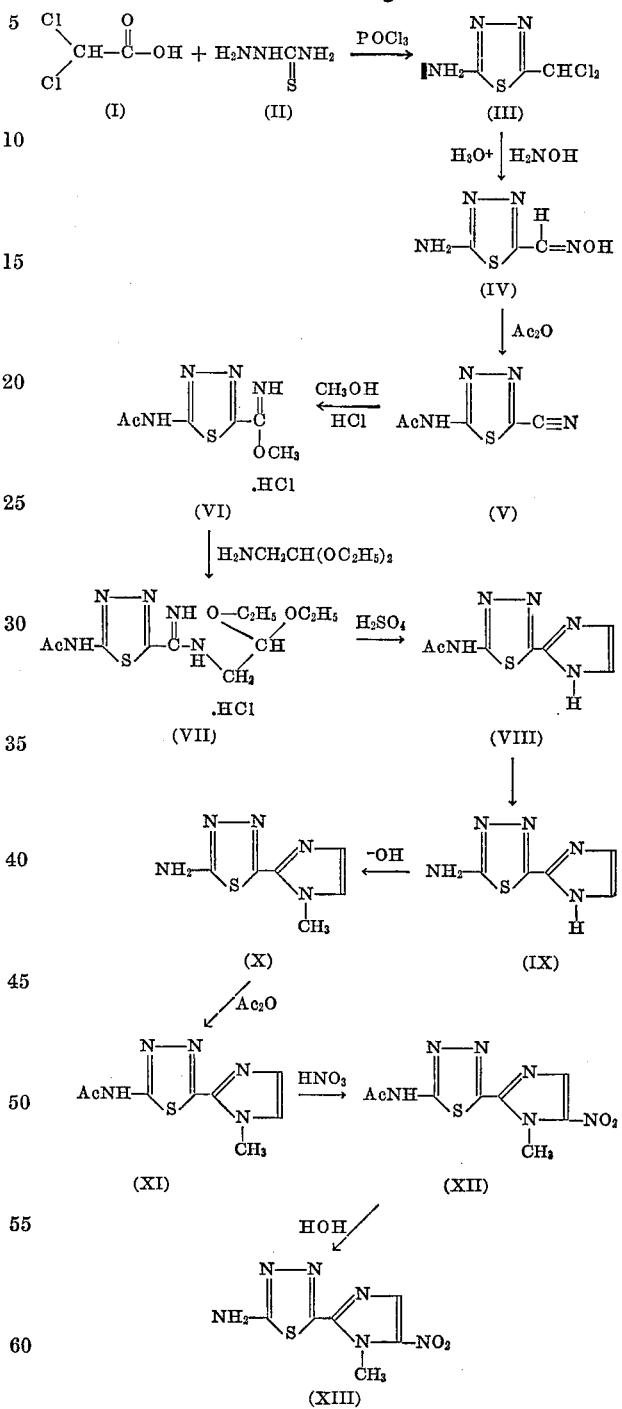

in which Ac is lower alkanoyl.

The initial 5-dichloromethyl-2-aminothiadiazole (III) is obtained by condensing dichloroacetic acid with thiosemicarbazide in the presence of phosphorus oxychloride. The latter reagent serves two functions: (1) to convert in situ the haloacetic acid to the corresponding acid chloride, and (2) in the absence of a second molar equivalent of acid halide or anhydride to activate the intermediate N₁-acyl thiosemicarbazide to cyclization via an intermediate such as B.

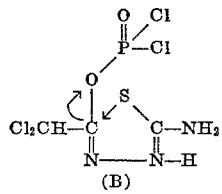

(B)

Hydrolysis of the dichloromethyl derivative (III) in the presence of hydroxylamine gives the amino aldoxime (IV) treatment of which with acetic anhydride furnishes the corresponding acetamido nitrile (V). The nitrile function is useful for the development of the imidazole ring, which is accomplished by conversion to the iminoether (VI) and subsequent treatment with aminoacetaldehyde acetal. The resulting amidine derivative (VII) is cyclized by treatment with strong acid, preferably sulfuric acid, and the imidazolyl thiadiazole (VIII) is formed. Deblocking of the amino nitrogen (to IX) methylation under alkaline conditions of the imidazole ring nitrogen (to X), reacetylation of the amino nitrogen (to XI), nitration to (XII) and hydrolysis completes the synthesis of 2-(2-amino-5-1,3,4-thiadiazoyl)-1-methyl - 5 - nitroimidazole (XIII). The activity of the latter compound and derivatives is shown hereinafter in the examples.

DETAILED DESCRIPTION

The following examples describe in detail the preparation of representative compounds within the scope of the present invention and testing data on conversion products of the present compounds.

EXAMPLE 1

Preparation of 2 - amino - 5 - dichloromethyl - 1,3,4-thiadiazole and 2 - amino - 1,3,4 - thiadiazole-5-carboxaldehyde oxime To an ice-cooled mixture of 9.11 g. (0.1 mole) of thiosemicarbazide and 12.89 g. (0.1 mole) of dichloroacetic acid is added slowly, with vigorous stirring, 30.67 g. (18 ml. 0.2 mole) of phosphorus oxychloride. After this addition is complete the ice bath is replaced by a water bath and the temperature is raised gradually to 70° C. Vigorous evolution of hydrogen chloride ensues as the temperature nears 70° C. and the mixture is briefly cooled to control foaming. After ca. 70 min. gas evolution ceases. The resulting viscous solution is stirred at 70° C. for an additional hour and then is cooled in an ice bath. To the thus-formed 2-amino-5-dichloromethyl-1,3,4-thiadiazole, a solution of 30 g. of hydroxylamine hydrochloride in 50 ml. of water is added followed by 20 ml. of concentrated hydrochloric acid immediately afterward. The mixture is stirred at 70° C. for 5 hours, cooled and filtered to remove some excess hydroxylamine hydrochloride. When the pH of the filtrate is adjusted to 6.0 by addition of 5 N sodium hydroxide, 2-amino-1,3,4-thiadiazole - 5 - carboxaldehyde oxime crystallizes as brownish prisms. It is washed with cold water and dried under reduced pressure. A 10.8 g. yield of material suitable for direct conversion to the nitrile is obtained (if desired, the oxime may be recrystallized from ethanol or from methanol-water).

EXAMPLE 2

Preparation of 2-acetamido-1,3,4-thiadiazole-5-carbonitrile

A mixture of 10.8 g. of the oxime (Example 1) and 100 ml. of acetic anhydride is heated at reflux temperature for 18 hours and then is concentrated under reduced pressure. The tan solid residue (13 g.) is dissolved in 50 ml. of hot methanol, diluted with 50 ml. of water and cooled. Yellow crystals of the nitrile are obtained. The yield of product melting at 226–230° C. is 8.5 g.

EXAMPLE 3

Preparation of 5-acetamido-1,3,4-thiadiazole-2-carboximidic acid methyl ester hydrochloride A mixture of 8.40 g. (50 mmoles) of 5-acetamido-1,3,4-thiadiazole-2-carbonitrile (Example 2) and 80 ml. of tetrahydrofuran is treated with 4.05 ml. (3.20 g., 100 mmoles) of methanol, chilled in an ice bath and saturated with anhydrous hydrogen chloride. A solid forms during this saturation process. The mixture is kept at 5° C. for 22 hours and then filtered. The solid imino ether hydrochloride is washed well with ether and can be used at this stage (melting point 202–208° C.; $\lambda_{max}$. 2.9, 3.1, 3.4, 5.9μ) directly in the next Example 12.

EXAMPLE 4

Preparation of 5-acetamido-N-(2,2-diethoxyethyl)-1,3,4-thiadiazole-2-carboxamidine hydrochloride The imino ether hydrochloride from Example 3 is added to an ice-cooled mixture of 5.25 g. (50 mmoles) of amino-acetaldehyde diethylacetal and 100 ml. of methanol. The resulting mixture is heated at reflux temperature for 19 hours and is then concentrated under reduced pressure. The gummy residue is triturated with ether containing a little methanol until the amidine hydrochloride crystallizes. The product is washed with ether and air dried. It has $\lambda_{max}$. 2.9, 3.4 (broad), 5.9μ; 278 mμ.

EXAMPLE 5

Preparation of 2-acetamido-5-(2-imidazolyl)-1,3,4-thiadiazole

The amine of Example 4 is added in portions to 20 ml. of concentrated sulfuric acid. The mixture, which foams and becomes warm, is cooled in a water bath when necessary. When complete solution is obtained it is poured onto 100 g. of ice and the resulting solution (filtered if necessary) is brought to pH 6 with 5 N sodium hydroxide (ice cooling). The precipitate that forms is washed with water and dried in air. This procedure gives 5.75 g. of yellow solid product that does not melt below 320° C.

EXAMPLE 5

Preparation of 2-amino-5-(2-imidazolyl)-1,3,4-thiadiazole dehydrochloride

A suspension of 4.18 g. (20 mmoles) of 2-acetamido-5-(2-imidazolyl)-1,3,4-thiadiazole (Example 5 in 50 ml. of concentrated hydrochloric acid is heated at reflux temperature until a clear solution results (40 min.). It is then concentrated under reduced pressure and the residue is dissolved in 10 ml. of water and neutralized to pH 5 with sodium hydroxide. The white solid that forms is washed with water and air dried. A 2.20 g. yield of product that decomposes above 285° C. is obtained.

EXAMPLE 7

Preparation of 2-amino-5-(1-methyl-2-imidazolyl)-1,3,4-thiadiazole

A mixture of 307 mg. (1.85 mmoles) of 2-amino-5-(2-imidazolyl)-1,3,4-thiadiazole (Example 6) and 3.8 ml. of 0.5 N sodium hydroxide is stirred and filtered to remove some insoluble material. The filtrate is treated with 0.17 ml. (1.85 mmoles) of dimethyl sulfate and is stirred for 45 minutes. The solid that separates is washed with water and dried in air. This procedure gives 124 mg. of nearly white crystalline product, melting point 258–260° C.

EXAMPLE 8

Preparation of 2-acetamido-5-(1-methyl-2-imidazolyl)-1,3,4-thiadiazole and 2-acetamido-5-(1-methyl-5-nitro-2-imidazolyl)-1,3,4-thiadiazole A mixture of 124 mg. (0.7 mole) of 2-amino-5-(1-methyl-2-imidazolyl)-1,3,4-thiadiazole (Example 7) and 0.4 ml. of acetic anhydride is heated on a steam bath for 5 minutes to give 2-acetamido-5-(1-methyl-2-imidazolyl)-1,3,4-thiadiazole. To the resulting mixture is added 1.2 ml. of acetic acid, 0.05 ml. of 70% nitric acid, and an additional 0.2 ml. of acetic anhydride. The mixture is heated on a steam bath and is treated with 0.02 ml. of 70% nitric acid. A vigorous reaction ensues and brown gas is evolved. In about 10 minutes a clear solution is obtained. It is concentrated and the residue is treated with water. The yellow solid that forms is washed with water and is dried in air. This procedure gives 61 mg. of 2-acetamido-5-(1-methyl-5-nitro-2-imidazolyl)-1,3,4-thiadiazole.

EXAMPLE 9

Preparation of 2-amino-5-(1-methyl-5-nitro-2-imidazolyl)-1,3,4-thiadiazole

A mixture of 60 mg. of crude 2-acetamido-5-(1-methyl-5-nitro-2-imidazolyl)-1,3,4-thiadiazole (Example 8) and 0.2 ml. of concentrated hydrochloric acid is heated on a steam bath for 15 minutes, cooled, and concentrated under reduced pressure. The residue is treated with 1 N hydroxide until pH 7 is obtained, whereupon solid separates. This solid is washed with water and dried in air, yield 23 mg. Partition chromatography on diatomaceous earth with a heptane-ethyl acetate-methanol-water (70:30:15:6) system gives several fractions absorbing at 357 m$\mu$. The largest of these fractions, upon concentration, affords yellow crystals which are identical in infrared spectrum and behavior on thin-layer chromatography with authentic sample of 2-amino-5-(1-methyl-5-nitro-2-imidazolyl)-1,3,4-thiadiazole.

EXAMPLE 10

Preparation of chick diet

The following feed composition is employed in all the poultry experiments hereinafter set forth except where otherwise stated:

| | Percent |
|---|---|
| Vitamin pre-mix | 0.5 |
| Trace minerals | 0.1 |
| Sodium chloride | 0.3 |
| Dicalcium phosphate | 1.2 |
| Ground limestone | 0.5 |
| Stabilized fate | 4 |
| Dehydrated Alfalfa, 17% | 2 |
| Corn gluten meal, 41% | 5 |
| Menhaden fish meal, 60% | 5 |
| Soybean oil meal, 44% | 30 |
| Ground yellow corn, fine to 100%. | |

The vitamin pre-mix in the above feed composition is prepared from the following formulation. The expressions of quantity relate to units per kilogram of the feed composition.

| | | |
|---|---|---|
| Butylated hydroxy toluene | mg | 125 |
| dl-Methione | mg | 500 |
| Vitamin A | I.U. | 3300 |
| Vitamin D$_3$ | I.U. | 1100 |
| Riboflavin | mg | 4.4 |
| Vitamin E | I.U. | 2.2 |
| Niacin | mg | 27.5 |
| Pantothenic acid | mg | 8.8 |
| Choline chloride | mg | 500 |
| Folic acid | mg | 1.43 |
| Menadione sodium bisulfate | mg | 1.1 |
| Vitamin B$_{12}$ | mcg | 11 |
| Ground yellow corn, fine to 5 gm. | | |

EXAMPLE 11

The use of 2-(2-amino-5-1,3,4-thiadiazolyl)-1-methyl-5-nitroimidazole and its acetyl derivative in controlling colibacillosis This example demonstrates the effectiveness of 2-(2-amino-5-1,3,4-thiadiazolyl)-1-methyl-5-nitroimidazole (Example 9) in controlling colibacillosis in poultry.

Three groups of 10 five-day old sex-linked pullet chicks are infected parenterally, in the left thoracic sac, with 0.2 ml. of a 10$^{-1}$ dilution of a Trypticase Soy Broth culture of *Escherichia coli*, the causative agent of colibacillosis in poultry. The compound 2-(2-amino-5-1,3,4-thiadiazolyl)-1-methyl-5-nitroimidazole is administered by gavage as a single oral dose in an aqueous solution or suspension, and the chicks are permitted to feed ad libitum the feed composition prepared in Example 10. Twelve days after treatment, the test is terminated and the number of survivors in each group recorded. The results are compared with two control groups of 20 chicks each, in which one control group is infected and untreated, and the second control group is uninfected and untreated. The results of the test are set forth in the following table:

| | Dose,[1] mg. | Total chicks tested | Survivors |
|---|---|---|---|
| Compound: 2-(2-amino-5-1,3,4-thiadiazoyl)-1-methyl-5-nitroimidazole | 160 | 10 | 10 |
| | 80 | 10 | 10 |
| | 40 | 10 | 10 |
| Control: | | | |
| Infected—untreated | | 20 | 2 |
| Uninfected—untreated | | 20 | 20 |

[1] Dose is in terms of milligrams per kilogram of body weight.

Four groups of 40, five-day old sex-linked pullet chicks are infected in the same manner as herein set forth with *Escherichia coli*. The compound 2-(2-acetamido-5-1,3,4-thiadiazolyl)-1-methyl-5-nitroimidazole (Example 8) is administered by gavage as a single oral dose in an aqueous medium, and the chicks are permitted to feed ad libitum the feed composition prepared in Example 10. Twelve days after treatment, the test is terminated and the number of survivors in each group recorded. The results are compared with two control groups of 40 chicks each, in which one control group is infected and untreated, and the second control group is uninfected and untreated. The results of the test are set forth in the following table.

TABLE II

| | Dose,[1] mg. | Total chicks tested | Survivors |
|---|---|---|---|
| Compound: 2-(2-acetamido-5-1,3,4-thiadiazolyl)-1-methyl-5-nitroimidazole | 40 | 40 | 39 |
| | 20 | 40 | 35 |
| | 10 | 40 | 29 |
| Control: | | | |
| Infected—untreated | | 40 | 3 |
| Uninfected—untreated | | 40 | 40 |

[1] Dose is in terms of milligrams per kilogram of body weight.

EXAMPLE 12

Utilization of 2-(2-amino-5-1,3,4-thiadiazolyl)-1-methyl-5-nitro-imidazole and acetal derivative in controlling fowl typhoid This example demonstrates the effectiveness of 2-(2-amino-5-thiadiazolyl)-1-methyl-5-nitroimidazole (Example 9), and 2-(2-acetamido-5-thiadiazolyl)-1-methyl-5-nitroimidazole (Example 8) in controlling fowl typhoid.

Nine groups, eight groups of five and one of ten, of one-day old sex-linked pullet chicks are infected orally by gavage with 0.5 ml. of a 10$^{-2}$ dilution of a five-hour Trypticase Soy Broth culture of *Salmonella gallinarum*, the causative agent of fowl typhoid. Each chick received approximately 6×10$^5$ viable cells.

Medication is administered continuously in the feed, beginning 3 hours before infection and continuing for 10 days, at which time the test is terminated and the number of survivors in each group recorded. The results are compared with two control groups of chicks, the first group comprising 20 chicks which are infected and untreated, and the second group comprising 10 chicks which are uninfected and untreated. The results of the test are set forth in the following table.

TABLE III

| Compound: | Dose,[1] percent | Total chicks tested | Survivors |
|---|---|---|---|
| 2-(2-amino-5-1,3,4-thiadiazolyl)-1-methyl-5-nitroimidazole | 0.1 | 10 | 9 |
| | 0.05 | 5 | 5 |
| | 0.025 | 5 | 5 |
| | 0.006 | 5 | 1 |
| 2-(2-acetamido-5-1,3,4-thiadiazolyl)-1-methyl-5-nitroimidazole | 0.1 | 5 | 5 |
| | 0.25 | 5 | 4 |
| | 0.006 | 5 | 3 |
| Control: | | | |
| Infected—untreated | | 20 | 0 |
| Uninfected—untreated | | 10 | 10 |

[1] Dose is in terms of percentage by weight of the feed composition prepared in Example 10.

EXAMPLE 13

Utilization of 2 - (2-amino-5-1,3,4-thiadiazolyl)-1-methyl-5-nitroimidazole in controlling enteritis Three groups of ten female Swiss Webster mice weighing 20 gm. were infected intraperitoneally with 0.5 ml. of $10^{-2}$ dilution of a five-hour Trypticase Soy Broth culture of *Salmonella choleraesuis* var. *kunzendorf*, the causative agent of enteritis in pigs, an organism originally recovered from a field outbreak of *Salmonella choleraesuis* var. *kunzendorf* in pigs. Each mouse received approximately $4.6 \times 10^7$ cells as the inoculating dose.

The mice are fed a medicated feed, which is a commercial mouse chow containing the compound 2-(2-amino-5-1,3,4-thiadiazolyl) - 1 - methyl-5-nitroimidazole (Example 9), for 3 hours before infection until 7 days after infection. The mice are held for an additional 7 days after the medication is stopped, and the number of survivors in each group recorded. The medicated feed is prepared by thoroughly admixing calculated amounts of 2-(2-amino-5-1,3,4-thiadiazolyl) - 1 - methyl - 5 - nitroimidazole with commercial mouse chow to provide essentially uniform distribution in the feed offered. The above results are compared with two control groups of ten mice each, in which one control group is infected and untreated, and the second control group is uninfected and untreated. The results of the test are set forth in the following table:

TABLE IV

| Compound: | Dose,[1] percent | Total mice tested | Survivors |
|---|---|---|---|
| 2-(2-amino-5-1,3,4-thiadiazolyl)-methyl-5-nitroimidazole | 0.1 | 10 | 10 |
| | 0.025 | 10 | 9 |
| | 0.006 | 10 | 1 |
| Control: | | | |
| Infected—untreated | | 10 | 2 |
| Uninfected—untreated | | 10 | 10 |

[1] Dose is in terms of percentage by weight of the commercial mouse chow.

EXAMPLE 14

Utilization of 2 - (2 - amino - 5-1,3,4-thiadiazolyl)-1-methyl - 5 - nitroimidazole in controlling *Trichomonas vaginalis* infections This example demonstrates, employing two modes of administration, the efficacy of 2-(2-amino-5-1,3,4-thiadiazolyl) - 1 - methyl - 5 - nitroimidazole (Example 9) against *Trichomonas vaginalis* infections.

The first mode of administration, hereinafter designated Test A, employs six groups of mice, three groups of five and three groups of ten. The mice are inoculated with 50,000 culture-derived *Trichomonas vaginalis* (Thoms strain). The above compound is thoroughly mixed into ground feed and presented to the mice one day after inoculation. The average ad libitum drug intake, that is milligrams per kilogram of body weight per day, is estimated from the drug diet intake for 5 full days, and mouse weights taken just before and just after treatment.

The second mode of administration, hereinafter designated Test B, employs six groups of mice, five groups of ten and one of five. The mice are inoculated with 50,000 culture-derived *Trichomonas vaginalis* (Thoms strain). The above compound is administered in a single oral dose by gavage one day after inoculation.

Six days of post-inoculation scrapings, from the subcutaneous sites of inoculation, are searched microscopically for motile trichomonads, and antitrichomonal activity is concluded in those instances where motile trichomonads are eliminated from lesions present at the site of inoculation.

Mouse body weight gain from day 1 to day 6 post-inoculation shows that 2 - (2 - amino - 5 - 1,3,4 - thiadiazolyl)- 1 - methyl - 5 - nitroimidazole is well tolerated by the animals ingesting same. Furthermore, experimentation demonstrates that more than 1,000 mg. per kilogram of body weight of said compound is well tolerated.

The results of the test are set forth in the following tables:

TEST A.—TABLE V

| Compound | Dose,[1] mg. | Total mice tested | Cleared | Percentage cleared |
|---|---|---|---|---|
| 2-(2-amino-5-1,3,4-thiadiazolyl)-1-methyl-5-nitroimidazole | 170 | 5 | 5 | 100 |
| | 95 | 5 | 5 | 100 |
| | 90 | 10 | 10 | 100 |
| | 65 | 5 | 4 | 80 |
| | 44 | 10 | 3 | 30 |
| | 10 | 10 | 0 | 0 |

[1] Dose is in terms of milligrams per kilogram of body weight per day.

TEST B.—TABLE VI

| Compound | Dose,[1] mg. | Total mice tested | Cleared | Percentage cleared |
|---|---|---|---|---|
| 2-(2-amino-5-1,3,4-thiadiazolyl)-1-methyl-5-nitroimidazole | 100 | 5 | 5 | 100 |
| | 50 | 10 | 10 | 100 |
| | 50 | 10 | 10 | 100 |
| | 25 | 10 | 9 | 90 |
| | 12 | 10 | 7 | 70 |
| | 6 | 10 | 2 | 20 |

[1] Dose is in terms of milligrams per kilogram of body weight.

We claim:
1. The compound 2-amino-1,3,4-thiadiazole-5-carboxaldehyde oxime.
2. The compound 2-acetamido-1,3,4-thiadiazole-5-carbonitrile.

References Cited
UNITED STATES PATENTS 3,598,830  8/1971  Berkelhammer et al. 260—306.8
3,700,684  10/1972  Remers et al. 260—306.8

RICHARD J. GALLAGHER, Primary Examiner